United States Patent Office 3,471,565
Patented Oct. 7, 1969

3,471,565
PHENANTHRENE COMPOUNDS AND PROCESSES OF PRODUCING SAID COMPOUNDS BY REACTING NOVEL TETRALONE COMPOUNDS WITH A REACTIVE DERIVATIVE OF BUTAN-2-ONE
Wataru Nagata, Nishinomiya-shi, Tadao Terasawa, Takatsuki-shi, and Tsutomu Sugasawa, Kobe-shi, Japan, assignors to Shionogi & Co., Ltd., Osaka, Japan
No Drawing. Filed Sept. 14, 1965, Ser. No. 487,309
Int. Cl. C07c 49/76, 43/20, 39/14
U.S. Cl. 260—590        9 Claims

ABSTRACT OF THE DISCLOSURE

Potent and selective antiandrogenic agents of the type of e.g. 4a-ethyl-7-methoxy-2,3,4,4a,9,10-hexahydrophenanthren-2-one are obtained via the corresponding 2-tetralones which are novel intermediates and can be prepared from the corresponding 1-tetralones via the novel corresponding dihydroaphthalene compounds. For details, cf. the following detailed description.

---

The present invention relates to novel valuable chemical compounds, especially to the phenanthrene compounds of the general formula:

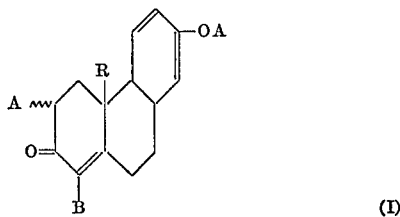

(I)

wherein R is a hydrogen atom or a hydrocarbon radical, R' is a hydrocarbon radical having 2–6 carbon atoms, and A and B are respectively hydrogen atoms or lower alkyls, which are potent and selective antiandrogenic agents, and the process for producing the same.

In the above-mentioned phenanthrene compounds I: R is a hydrogen atom or a hydrocarbon radical of saturated or unsaturated (inclusive of aromatic) straight or branched chain or ring system, e.g. methyl, ethyl, propyl, isopropyl, butyl, pentyl, hexyl, cyclohexyl, phenyl, benzyl, tolyl, allyl, vinyl, ethynyl, or the like; R' is a hydrocarbon radical having 2–6 carbon atoms of saturated or unsaturated (inclusive of aromatic) straight or branched chain or ring system, e.g. ethyl, propyl, isopropyl, butyl, pentyl, hexyl, phenyl, cyclohexyl, allyl, vinyl, ethynyl, or the like; and A or B is a hydrogen atom or a lower alkyl such as methyl, ethyl, propyl, butyl or the like.

The above-mentioned phenanthrene compound I is prepared from a corresponding 2-tetralone compound of the formula:

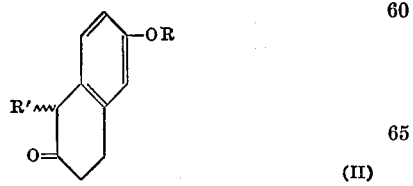

(II)

wherein R and R' have the same meanings as respectively defined above, by reaction with a reactive derivative of butan-2-one represented by the formulae:

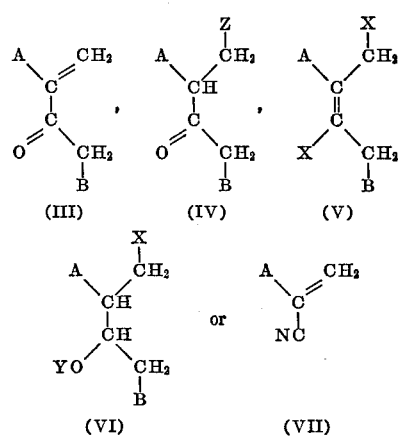

wherein A and B have the same meanings as respectively defined above, is a halogen atom, Y is a hydrocarbon radical and Z is a halogen atom, a tertiary amino group, a quaternary ammonium group of —OSO$_2$Y' group, in which Y' is a hydroxy group, Y or —OY group, in the presence of a basic catalyst, followed by acid treatment, oxidation, and ring closure when the compound VI is used as the said reactive derivative of butan-2-one or followed by alkali treatment and Grignard reaction with an alkylmagnesium halide when the compound VII is used as the said reactive derivative of butan-2-one.

In the above formulae: is a halogen atom such as chlorine, bromine or iodine; Y is a hydrocarbon radical of saturated or unsaturated (inclusive of aromatic) straight or branched chain or ring system, e.g. methyl, ethyl, propyl, isopropyl, butyl, pentyl, cyclohexyl, phenyl, benzyl, tolyl, allyl, vinyl, ethynyl, or the like; and Z is a halogen atom (e.g. chlorine, bromine or iodine), a tertiary amino group (e.g. dimethylamino, diethylamino, pyrrolidino, morpholino, or the like), a quarternary ammonium group (e.g. trimethyl-, triethyl-, pyrrolidino- or morpholino-bromide, -iodide, -chloride, -sulfate, -hydroxide or the like) or a sulfonic acid residue —OSO$_2$Y', in which Y' is a hydoxy group, Y or —OY group.

The above-mentioned 2-tetralone compound II is prepared from a 1-tetralone compound of the formula:

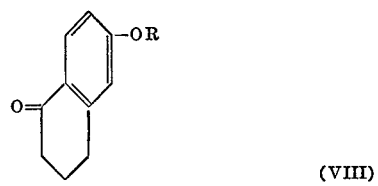

(VIII)

wherein R has the same meaning as defined above, by reaction with an organo-metal compound bearing one or more hydrocarbon radicals each having 2–6 carbon atoms followed by dehydration to convert to the corresponding dihydronaphthalene compound of the formula:

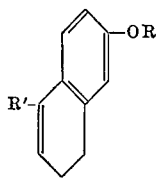

(IX)

wherein R and R' have the same meanings as respectively defined above, and oxidation of the dihydronaphthalene with an oxidizing agent, or alternatively from a 2-tetralone compound of the formula:

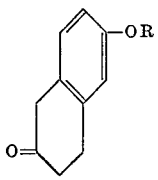

(X)

wherein R has the same meaning as defined above, by condensation with a secondary amine of the formula:

(XI)

wherein Q and Q' are the same or different lower alkyls or they together with the nitrogen atom constitute a substituted or unsubstituted nitrogen or nitrogen-and-oxygen containing heterocyclic ring system, to convert to the corresponding enamine compound of he formula:

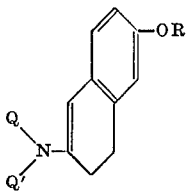

(XII)

wherein R, Q and Q' have the same meanings as respectively defined above, and the reaction of the enamine with R'X' (wherein R' has the same meaning as defined above and X' is a halogen atom or —$OSO_2Y'$ group, in which Y' has the same meaning as defined above) followed by hydrolysis.

In the above formulae, Q and Q' are the same or different lower alkyls (e.g. methyl, ethyl, propyl, isopropyl, butyl, or the like) or they together with the nitrogen atom constitute a substituted or unsubstituted nitrogen or nitrogen-and-oxygen containing heterocyclic ring system, such as pyrrolidino, piperidino, N-methylpiperazino, morpholino, 2,4-dimethylpyrrolidino, 3-propylpiperidino, 2-methylpyrrolidino, 3-ethylpyrrolidino, 3-isopropylpyrrolidino, 3,4-dimethylpyrrolidino, 3,3-dimethylpyrrolidino, 2-methylmorpholino, 3-methylmorpholino, or the like.

An object of the present invention is to provide novel valuable phenanthrene compounds. Another object of the invention is to provide the process for preparing the phenanthrene compounds. Another object to provide novel useful intermediates for the process. Another object is to provide potent and selective antiandrogenic agents. The other objects of the present invention may be apparent to a man in the art according to the following disclosure.

As novel phenanthrene compounds of the invention (I) the following may be exemplified:

4a-ethyl-7-hydroxy-2,3,4,4a,9,10-hexahydrophenanthren-2-one,
4a-ethyl-7-methoxy-2,3,4,4a,9,10-hexahydrophenanthren-2-one,
4a-ethyl-7-ethoxy-2,3,4,4a,9,10-hexahydrophenanthren-2-one,
4a-ethyl-7-propoxy-2,3,4,4a,9,10-hexahydrophenanthren-2-one,
4a-ethyl-7-butoxy-2,3,4,4a,9,10-hexahydrophenanthren-2-one,
4a-ethyl-7-phenoxy-2,3,4,4a,9,10-hexahydrophenanthren-2-one,
4a-ethyl-7-benzyloxy-2,3,4,4a,9,10-hexahydrophenanthren-2-one,
4a-propyl-7-hydroxy-2,3,4,4a,9,10-hexahydrophenanthren-2-one,
4a-propyl-7-methoxy-2,3,4,4a,9,10-hexahydrophenanthren-2-one,
4a-isopropyl-7-methoxy-2,3,4,4a,9,10-hexahydrophenanthren-2-one,
4a-butyl-7-hydroxy-2,3,4,4a,9,10-hexahydrophenanthren-2-one,
4a-butyl-7-methoxy-2,3,4,4a,9,10-hexahydrophenanthren-2-one,
4a-pentyl-7-methoxy-2,3,4,4a,9,10-hexahydrophenanthren-2-one,
4a-hexyl-7-methoxy-2,3,4,4a,9,10-hexahydrophenanthren-2-one,
4a-phenyl-7-methoxy-2,3,4,4a,9,10-hexahydrophenanthren-2-one,
4a-allyl-7-methoxy-2,3,4,4a,9,10-hexahydrophenanthren-2-one,
4a-cyclohexyl-7-methoxy-2,3,4,4a,9,10-hexahydrophenanthren-2-one,
4a-ethyl-7-vinyloxy-2,3,4,4a,9,10-hexahydrophenanthren-2-one,
4a-ethyl-7-ethynyloxy-2,3,4,4a,9,10-hexahydrophenanthren-2-one,
1-methyl-4a-ethyl-7-hydroxy-2,3,4,4a,9,10-hexahydrophenanthren-2-one,
1-methyl-4a-ethyl-7-methoxy-2,3,4,4a,9,10-hexahydrophenanthren-2-one,
3-methyl-4a-ethyl-7-methoxy-2,3,4,4a,9,10-hexahydrophenanthren-2-one,
1,3,-dimethyl-4a-ethyl-7-methoxy-2,3,4,4a,9,10-hexahydrophenanthren-2-one,
1,4a-diethyl-7-hydroxy-2,3,4,4a,9,10-hexahydrophenanthren-2-one,
1,4a-diethyl-7-methoxy-2,3,4,4a,9,10-hexahydrophenanthren-2-one,
3,4a-diethyl-7-methoxy-2,3,4,4a,9,10-hexahydrophenanthren-2-one,
3-methyl-4a-propyl-7-methoxy-2,3,4,4a,9,10-hexahydrophenanthren-2-one,
1-propyl-4a-ethyl-7-methoxy-2,3,4,4a,9,10-hexahydrophenanthren-2-one,
3,4a-dibutyl-7-hydroxy-2,3,4,4a,9,10-hexahydrophenanthren-2-one,
or the like.

The novel phenanthrene compounds represented by the Formula I and specifically illustrated about exhibit commonly potent antiandrogenic activity and no significant side effects (e.g. non-toxic in blood picture analysis and histological examination, no effect on gonadotropin secretion and no other hormonal response). For example 4a-ethyl - 7 - methoxy-2,3,4,4a,9,10-hexahydrophenanthren-2-one (compound I), 4a-propyl-7-methoxy-2,3,4,4a,9,10-hexahydrophenanthren-2-one (compound II), 4a-allyl-7-methoxy-2,3,4,4a,9,10-hexahydrophenanthren-2-one (compoud III) and 4a-ethyl-7-hydroxy-2,3,4,4a,9,10-hexahydrophenanthren-2-one (compound IV) antagonizes to the response induced by $1/10$ amount of testosterone propionate (TP) and corresponds to the response induced by twice the amount of progesterone in androgenicity on rats by subcutaneous injection for consecutive 10 days (10 mg./ once daily), as shown in the following table:

|  | Weight (mg.) | | |
| --- | --- | --- | --- |
|  | Seminal-Vesicles | Ventral-Prostate | Levator Ani Muscle |
| Control | 6.5 | 7.0 | 20.0 |
| TP | 99.1 | 96.5 | 40.0 |
| Compound I (+TP) | 82.2 | 82.5 | 44.6 |
| Compound II (+TP) | 84.3 | 84.7 | 45.4 |
| Compound III (+TP) | 80.6 | 81.8 | 43.9 |
| Compound IV (+TP) | 83.6 | 84.0 | 45.1 |
| Progesterone (+TP) | 87.8 | 94.0 | 39.5 |

As to the 1-tetalone compound VIII the following may be exemplified:

6-hydroxy-1,2,3,4-tetrahydronaphthalen-1-one,
6-methoxy-1,2,3,4-tetrahydronaphthalen-1-one,
6-ethoxy-1,2,3,4-tetrahydronaphthalen-1-one,
6-propoxy-1,2,3,4-tetrahydronaphthalen-1-one,
6-isopropoxy-1,2,3,4-tetrahydronaphthalen-1-one,
6-butoxy-1,2,3,4-tetrahydronaphthalen-1-one,
6-pentyloxy-1,2,3,4-tetrahydrontphthalen-1-one,
6-hexyloxy-1,2,3,4-tetrahydronaphthalen-1-one,
6-cyclohexyloxy-1,2,3,4-tetrahydronaphthalen-1-one,
6-phenoxy-1,2,3,4-tetrahydronaphthalen-1-one,
6-benzyloxy-1,2,3,4-tetrahydronaphthalen-1-one,
6-p-tolyloxy-1,2,3,4-tetrahydronaphthalen-1-one,
6-allyloxy-1,2,3,4-tetrahydronaphthalen-1-one,
6-vinyloxy-1,2,3,4-tetrahydronaphthalen-1-one,
6-ethynyloxy-1,2,3,4-tetrahydronaphthalen-1-one,
or the like.

The compound VIII is first subjected to reaction with an organo-metal compound bearing one or more hydrocarbon radicals each having 2–6 carbon atoms, wherein the hydrocarbon radical having 2–6 carbon atoms has the same significance as defined for R' and the metal component may be selected from alkali metal such as lithium and alkaline earth metal such as magnesium, zinc or the like (an alkaline earth metal bearing two hydrocarbon radicals or a combination of one hydrocarbon radical and one halogen atom, e.g. diethylzinc, ethylmagnesium chloride, propylmagnesium iodide, phenylmagnesium bromide, or the like). The reaction, which is one of 1,2-addition of organo-metal compound to carbonyl group, can be carried out in an inert solvent under preferably mild reaction condition. As to the conventional solvent in this reaction, ethers, hydrocarbons (especially benzene is profitable) or mixtures of other inert solvents therewith may be exemplified. The reaction with an alkali metal compound can be carried out at a lower temperature (e.g. from −10° C. to room temperature) in a brief period (e.g. within 5 hours). The reaction with an alkline earth metal compound can be carried out in a temperature range from 0° C. to boiling point of the solvent used and in a reaction period within one or more days. The resultant product is then hydrolyzed at low temperature according to the conventional manner with water, or aqueous acid or salt solution such as ammonium chloride to afford corresponding tertiary alcohl, 1-R'-6-RO-1,2,3,4-tetrahydronaphthalen-1-ol, which can be isolated and purified before the subsequent reaction steps. The resulting tertiary alcohol is then dehydrated by a conventional dehydrating agent such as acid, base, salt or others according to the conventional manner to afford the corresponding dihydro compound IX. The two (hydrolysis and dehydration) treatments can be carried out in one step when the suitable reagent and condition are applied.

The resulting dihydronaphthalene compound IX is oxidized to convert to the key intermediate, 2-tetralone compound II. The reaction is carried out by oxidation with an oxidizing agent followed by, if required, elimination with an eliminating agent. As to the oxidizing agent, the following can be exemplified: Inorganic peroxide such as chromium trioxide, selenium dioxide (they usually afford the objective 2-tetralone II directly), potassium permanganate, potassium perchlorate, lead tetroxide, lead acetate, osmium tetroxide, ruthenium tetroxide, hydrogen peroxide (they usually afford the intermediate of α-glycol type or its ester, which requires elimination to convert to the compound II), or the like; organic peroxide such as performic acid, peracetic acid, perbenzoic acid, monoperphthalic acid, or the like (they usually afford the α-glycol or its ester intermediate); halogen-containing agent such as chlorine, bromine, hypochloric acid or its salt or ester, N-halo carbonamide or imide (e.g. N-bromoacetamide, N-chlorophthalimide, N-bromosuccinimide, etc.), a combination of iodine and a silver salt of organic acid (e.g. acetic acid, benzoic acid, or the like) (they usually afford the α-glycol or its ester intermediate or, in some cases, directly the compound II, or else halogenated intermediate which can be converted to the compound II according to the following elimination reaction), or the like. The oxidation reaction may be carried out with one of the above oxidizing agents at a temperature range from −30° C. to boiling point of solvent used within 2 days according to the conventional manner each designated to the respective reagent. When the compound II is directly obtainable, the process proceeds to the next step; however, when the reaction affords a intermediate (α-glycol type inclusive of its ester, salt or halogen derivative), this must be subjected to an elimination reaction. The elimination reaction can be accomplished by known dehydrating, acid-eliminating or halogen-eliminating agent such as acid, acid salt, base (e. g. hydrochloric acid, potassium hydrogensulfate, sodium hydroxide, picoline, collidine, or the like) at from room temperature to boiling point of the solvent within several hours, according to the conventional manner.

Instead of the above-mentioned route (VIII to II), the compound II can be prepared from a 2-tetralone compound X. The compound X is firstly subjected to condensation reaction with a secondary amine XI in an inert solvent such as benzene, tetrahydrofuran, dioxane, methanol, ethanol, or others at the reaction temperature within room temperature to boiling points for several hours, according to the conventional procedure in enamine systhesis. In this reaction, it is more preferable to utilize the azeotropic nature of the solvent to remove produced water in the reaction (e.g. benzene, toluene, or the like).

The resultant enamine compound XII is then subjected to reaction with alkylating agent represented by the formula R'X', of which specific examples may be ethyl iodide, propyl iodide, isopropyl iodide, phenyl bromide, ethyl p-toluenesulfonate, diethyl sulfate, ethyl methanesulfonate, allyl bromide, or the like. The reaction is carried out in an inert solvent such as dioxane, acetonitrile, benzene, methanol, or the like with preferably heating up to the boiling point of the solvent used within several hours. The thus produced addition compound is then hydrolyzed to convert to the compound II. The hydrolysis can be attained by the action of any of acid, base, water, or aqueous salt solution at from room temperature to elevated temperature below 100° C. within several hours.

The key intermediate thus produced (II) is finally converted to the product (I) by condensation with a reactive derivative of butan-2-one as represented by any one of Formulae III to VII, in the presence of a basic catalyst. As the catalyst, the following can be exemplified: inorganic base such as an alkali metal (e.g. sodium, potassium or the like), an alkali metal hydroxide (e.g. sodium hydroxide, potasium hydroxide or the like), and alkaline earth metal hydroxide (e.g. calcium hydroxide), an alkali metal carbonate (e.g. potassium carbonate), an alkali metal alkoxide (e.g. sodium methoxide, potassium t-butoxide, sodium isopropoxide, or the like), an alkali metal amide or hydride (e.g. sodium amide, sodium hydride); organic base such as an amine, amine salt or ammonium compound (e.g. triethylamine, dimethylaniline, pyridine, pyridine hydrochloride, picoline, collidine, trimethylbenzylammnoium hydroxide, or the like)

and triphenylmethyl sodium or the like. The reaction with III (e.g. 3-buten-2-one, 1-penten-3-one, 3-methyl-3-buten-2-one, 2-methyl-1-penten-3-one, 1-hexen-3-one, 1-hepten-3-one, 3-ethyl-3-buten-2-one, or the like) may be carried out in an inert solvent such as water, methanol, ethanol, isopropanol, t-butanol, benzene, ether, tetrahydrofuran, dioxane, or the like, or mixtures thereof or, in some cases, without solvent at a temperature range from melting point to boiling point of the solvent used within a reaction period not more than 2 days. This reaction directly produces the compound I in the presence of excess amount of the said catalyst, however, it may be preferable to yield the corresponding 1,5-diketone intermediate as shown by the following formula:

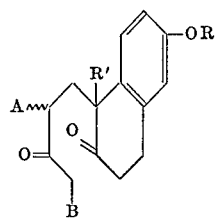

(XIII)

intermedially, in the presence of small amount of the catalyst, and then to subject to dehydrative ring closure by the action of acid or base. The reaction with IV (e.g. 4-chlorobutan-2-one, 4-p-toluenesulfonyloxybutan-2-one, 4-dimethylaminobutan-2-one, N-(3-oxobutyl)-trimethylammonium hydroxide, N-(3-oxobutyl)-diethylmethylammonium iodide, 1-chloro-3-pentanone, 2-methyl-3-oxo-pentyl sulfate, or the like) may be carried out in a similar manner as above reaction with III, and affords directly or indirectly the objective compound I as above. The reaction with V (e.g. 2,4-dichloro-2-butene or the like) may be also carried out in the same manner and affords an intermediate of the formula:

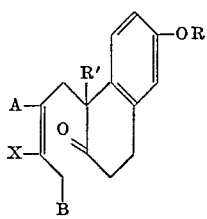

(XIV)

which can be converted to the compound I easily by dehydrative ring closure with acid, especially concentrated sulfuric acid. The reaction with VI (e.g. 4-chloro-2-butyl benzyl ether or the like) may be also carried out in the same manner and thereby affords an intermediate of the formula:

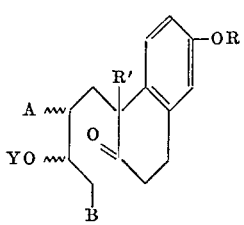

(XV)

which is hydrolyzed by acid (e.g. hydrochloric acid or the like), oxidized by an oxidation agent (e.g. chromium trioxide or the like) to XIII and finally subjected to a dehydrative ring closure in a manner as described above. The reaction with VII (e.g. acrylonitrile or the like) can be carried out also in the same manner and thereby affords an intermediate of the formula:

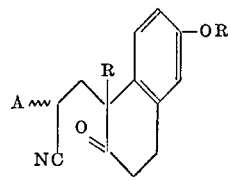

(XVI)

which is hydrolyzed by alkali (e.g. sodium hydroxide or the like), then subjected to Grignard reaction with an alkylmagnesium halide (wherein the alkyl carbon number is larger by one than B) and affords the compound I.

In the above-mentioned respective steps, the reaction products should not always be isolated and purified, however it is preferable to carry out such methods in some steps to avod unexpected troubles. Each product of the respective steps is usually amorphous and therefore isolation in every step does not afford best yield. For the isolation or purification method distillation, especially distillation under reduced pressure, chromatography, or chemical conversion through a carbonyl derivative with a carbonyl reagent such as semicarbazide, Girard T, or the like can be effectively applied.

The new phenanthrene compounds I of the present invention are useful, by virtue of their anti-androgenic action, inter alia in the treatment of virilism in any of the various aspects thereof. The compounds I are also useful for concomitant administration with other medicaments which are indicated for a particular purpose but which concomitantly exert an undesired androgenic action. The concomitantly employed compounds I suppress the undesired androgenic action. Administration is in the usual way, e.g. orally by way of tablets, as well as in other ways.

In the following examples, g.=grams, ml.=milliliters.

EXAMPLE 1

1-ethyl-6-methoxy-3,4-dihydronaphthalene

Into a solution prepared by reaction 12 g. of magnesium metal and 78 g. of ethyl iodide in 250 ml. of anhydrous ether, a solution of 44 g. of 6-methoxy-1,2,3,4-tetrahydronaphthalen-1-one in a mixture of 350 ml. of anhydrous ether and 50 ml. of tetrahydrofuran is added dropwisely within about 1 hour under ice-cooling and stirring. The resulting mixture is refluxed for 1 hour and thereafter allowed to stand overnight at room temperature. The reaction mixture is decomposed by addition of dilute hydrochloric acid solution under cooling and the organic layer is collected. The aqueous layer is extracted with ether and the resulting two organic layers are combined and evaporated to afford 45 g. of crude brown oily 1-ethyl-6-methoxy-1,2,3,4-tetrahydronaphthalen-1-ol.

The resultant crude product is dissolved into 1 liter of methanol and refluxed for 40 minutes with addition of 30 ml. of concentrated hydrochloric acid. The reaction mixture is concentrated under reduced pressure, diluted with water and then extracted with ether. The extract is washed with dilute aqueous sodium carbonate solution and aqueous sodium chloride solution in order, dried over anhydrous sodium sulfate and evaporated under reduced pressure to afford 40.6 g. of yellow oil as residue. On distillation of the yellow residue 36 g. (yield: 77%) of 1-ethyl-6-methoxy-3,4-dihydronaphthalene, B.P.$_{2.3}$ 119–121° C. is obtained.

1-ethyl-6-methoxy-1,2,3,4-tetrahydronaphtalen-2-one 1-ethyl-6-methoxy-3,4-dihydronaphthalene (13.2 g.) is dissolved in 65 ml. of chloroform. The resulting solution is stirred at −10 to −5° C. and 108 ml. of 0.716 molar-concentration solution of perbenzoic acid in chloroform is dropwisely added thereto within 80 minutes. The reaction mixture is kept at the same temperature for 1 hour and then allowed to stand at 0° C. overnight. The resultant reaction mixture is added to 350 ml. of ether, washed with aqueous dilute sodium hydroxide solution and aqueous sodium chloride solution in order and then evaporated to afford 16.2 g. of oily product as residue. The product is dissolved in 100 ml. of methanol and the resulting mixture is refluxed for 50 minutes under nitrogen atmosphere with addition of 2 N hydrochloric acid (18 ml.). The reaction mixture is concentrated under reduced pressure and the residue is dissloved in ether. The ethereal solution is washed with aqueous dilute sodium carbonate solution and water in order, and then evaporated to yield 14.5 g. of orange oil. The oil is dissolved in 250 ml. of methanol and the solution is refluxed for 30 minutes in nitrogen atmosphere after adding 100 ml. of 1 N aqueous sodium carbonate solution. The reaction mixture is concentrated under reduced pressure, admixed with water and extracted with ether. The extract is washed with dilute aqueous sodium carbonate solution and water in order, dried over anhydrous sodium sulfate and distilled to remove solvent, thereby 13.5 g. of orange oil is remained. The remaining oil is distilled to obtain 11.6 g. (yield: 81%) of crude 1-ethyl-6-methyl-1,2,3,4-tetrahydronaphthalen-2-one, B.P.$_{3.5}$ 155–172° C.

The crude 1-ethyl-6-methoxy-1,2,3,4-tetrahydronaphthalen-2-one is dissolved in 150 ml. of ethanol and a mixture of 7.6 g. of semicarbazide hydrochloride, 5.6 g. of sodium acetate and 40 ml. of water is added thereto. The reaction mixture is refluxed for 1 hour, distilled to concentrate under reduced pressure, added with water, allowed to stand over night at room temperature and the resulting crystals are collected, whereby 9.6 g. (yield: 65%) of the semicarbazone, M.P. 183–185° C. is obtained.

The thus obtained semicarbazone (23.7) is suspended in a mixture of 200 ml. of 1 N hydrochloric acid solution and 50 ml. of benzene and heated with vigorous stirring, thereby the suspensoid is gradually dissolved out in accordance with progress of the decomposition reaction within about 1.5 hours. The reaction mixture is admixed with ice-water and extracted with ether. The ethereal solution is washed successively with aqueous dilute sodium carbonate solution and water, dried over anhydrous sodium sulfate and evaporated to give 19.15 g. of oily product. The oil is purified by distillation under reduced pressure and affords 16.5 g. (yield: 89%) of 1-ethyl-6-methoxy-1,2,3,4-tetrahydronaphthalen-2-one, B.P.$_{0.08}$ 118–122° C.

4a-ethyl-7-methoxy-2,3,4,4a,9,10-hexahydrophenanthren-2-one

To a solution prepared from 1.0 g. of sodium metal and 45 ml. of anhydrous methanol, a solution of 16.3 g. of above 1-ethyl-6-methoxy-1,2,3,4-tetrahydronaphthalen-2-one in 75 ml. of anhydrous methanol is added at −5 to 0° C. under stirring in nitrogen atmosphere. The mixture is, after adding a solution of 6.2 g. of 3-buten-2-one in 35 ml. of anhydrous methanol gradually (within about 20 minutes), kept at the same temperature for 30 minutes and at room temperature for 1 hour under stirring and further refluxed for 2 hours. The reaction mixture is neutralized by adding acetic acid, evaporated under reduced pressure and the resultant evaporation residue is dissolved in chloroform. The chloroform solution is washed with aqueous sodium chloride solution, dried over anhydrous sodium sulfate and then evaporated under reduced pressure to leave 21.5 g. of brownish orange oil. On standing the oil in a mixture of ether-pentane at −2 to 0° C. overnight, pale yellow crystals (10.1 g. M.P. 75–76° C.) separate out. After filtration to remove the crystals, the mother liquor is again kept standing under cooling in the same manner, whereby a further (1.2 g.) crop of the same crystals is obtained. The final mother liquor (containing about 10 g. of amorphous substance) is chromatographed on neutral alumina (125 g). Eluate from petroleum ether-benzene (9:1) mixture affords 2.5 g. of the same crystals after recrystallizing from ether-pentane mixture. Total yield of 4a-ethyl-7-methoxy-2,3,4,4a,9,10-hexahydrophenanthren-2-one is 13.8 g. (67%).

EXAMPLE 2

1-butyl-6-methoxy-3,4-dihydronaphthalene

Into a solution prepared from 17 g. of magnesium metal, 96 g. of butyl bromide and 380 ml. of anhydrous ether, a solution of 70.5 g. of 6-methoxy-1,2,3,4-tetrahydronaphthalen-1-one in a mixture of 530 ml. of anhydrous ether and 80 ml. of tetrahydrofuran is added dropwisely within about 1 hour with external ice-cooling (5–10° C.) under stirring. The resulting mixture is refluxed for 5 hours and then allowed to stand overnight at room temperature. The reaction mixture is then treated as in the above example, whereby 101 g. of crude product, 1-butyl-6-methoxy-1,2,3,4-tetrahydronaphthalen-1-ol is obtained.

The resultant crude product is dehydrated by treatment with hydrochloric acid in methanol, extracted with chloroform and purified by distillation in the same manner as in the above example, whereby 70.2 g. (yield: 81%) of 1-butyl-6-methoxy-3,4-dihydronaphthalene, B.P.$_{0.2}$ 113–116° C. is obtained.

1-butyl-6-methoxy-1,2,3,4-tetrahydronaphthalen-2-one

The resultant product above (10 g.) is, according to the same procedure as in the above Example 1, oxidized by perbenzoic acid solution in chloroform, treated successively with hydrochloric acid and sodium carbonate, and distilled under reduced pressure, whereby 1-butyl-6-methoxy-1,2,3,4-tetrahydronaphthalen-2-one, B.P.$_{0.06}$ 135–145° C. is obtained.

On purification of the product through the corresponding semicarbazone in the same procedure as above, the pure product, B.P.$_{0.06}$ 130–135° C., IR: $\nu_{max.}^{CCl_4}$ 1715, 1605, 1580, 1500, 1270, 1040 cm.$^{-1}$ is obtained.

4a-butyl-7-methoxy-2,3,4,4a,9,10-hexahydrophenanthren-2-one

Reaction with 20 g. of the above resultant 1-butyl-6-methoxy-1,2,3,4-tetrahydronaphthalen-2-one and 3-buten-2-one in a manner same as that in the above Example 1 affords red oil, which is chromatographed over neutral alumina. Eluate from petroleum ether-benzene (9:1) mixture is collected and, according to the conventional procedure, is converted to the corresponding semicarbazone (M.P. 116–120° C.). On recovering pure 4a-butyl-7-methoxy-2,3,4,4a,9,10-hexahydrophenanthren-2-one (IR: $\nu_{max.}^{CCl_4}$ 1676, 1610, 1500, 1251, 1046 cm.$^{-1}$)

is obtained.

EXAMPLE 3

1-phenyl-6-methoxy-3,4-dihydronaphthalene

Into a solution prepared by the reaction of 19.4 g. of magnesium metal and 125.6 g. of phenyl bromide in 380 ml. of anhydrous ether, a mixture of 70.5 g. of 6-methoxy-1,2,3,4-tetrahydronaphthalen-1-one, 530 ml. of anhydrous ether and 80 ml. of tetrahydrofuran is added dropwisely within about 1 hour under stirring and cooling. The resultant mixture is refluxed for 5 hours, kept standing at room temperature over night, admixed with ice-water, and thereafter treated in the same manner as Example 1, whereby 115 g. of crude product, 1-phenyl-6-methoxy-1,2,3,4-tetrahydronaphthalen-1-ol is obtained.

The resultant crude product is dehydrated by concentrated hydrochloric acid in methanol and the reaction mixture is extracted with dichloromethane. The extract solution affords 116.8 g. of brown oil by evaporation. The oil affords 74.4 g. of 1-phenyl-6-methoxy-3,4-dihydronaphthalene, M.P. 71–73° C. after crystallization from petroleum ether and recrystallization from aqueous ethanol. On treatment with Girard T, the mother liquor affords further crop of the same product (16.7 g.); total yield is 91.1 g. (96%).

1-phenyl-6-methoxy-1,2,3,4-tetrahydronaphthalen-2-one

To a solution of 90 g. of 1-phenyl-6-methoxy-3,4-dihydronaphthalene in 400 ml. of chloroform, 720 ml. of perbenzoic acid solution in chloroform ($3.66 \times 10^{-1}$ molar concentration) is added dropwisely within about 95 minutes under stirring at $-25$ to $-10°$ C. The resultant mixture is stirred at the same temperature for 45 minutes and then allowed to stand overnight at 0° C. After addition of aqueous dilute sodium hydroxide solution, the reaction mixture is extracted with ether, which affords 108.5 g. of yellowish brown oil after being washed with water and evaporated. The oil is dissolved in 650 ml. of methanol and, after addition of 2 N hydrochloric acid (110 ml.), refluxed for 50 minutes under nitrogen atmosphere, evaporated under reduced pressure, admixed with water, and then extracted with ether. The resultant extract is washed in order with aqueous dilute sodium hydroxide solution and water, and evaporated to leave 112 g. of yellowish brown oil. The oil is dissolved in 1 liter of methanol and, after addition of 1 N sodium carbonate solution (450 ml.), refluxed for 30 minutes under nitrogen atmosphere. The reaction mixture is distilled under reduced pressure and the remaining residue is admixed with water and then extracted with ether. The extract is washed with water, dried over anhydrous sodium sulfate, and evaporated under reduced pressure to afford 1-phenyl - 6 - methoxy - 1,2,3,4 - tetrahydronaphthalen-2-one. Pure product is obtained by distillation under reduced pressure, B.P.$_{0.9}$ 160–165° C.

4a-phenyl-7-methoxy-2,3,4,4a,9,10-hexahydrophenananthren-2-one

A solution of 24 g. of 1-phenyl-6-methoxy-1,2,3,4-tetrahydronaphthalen-2-one in 120 ml. of anhydrous methanol is added dropwisely into a solution of 1.2 g. of sodium metal in 60 ml. of anhydrous methanol at 0° C. within 15 minutes. To the above mixture, a solution of 7.5 g. of 3-buten-2-one in 90 ml. of anhydrous methanol is added dropwisely within 30 minutes at the same temperature. The resultant mixture is allowed to react for 30 minutes at the same temperature and for 1 hour at room temperature under stirring and then for 4.5 hours under refluxing. The reaction mixture is neutralized with acetic acid under ice-cooling, evaporated under reduced pressure, and the resulting residue is, after being admixed with water, extracted with dichloromethane. The extract solution is washed with water, dried over anhydrous sodium sulfate, and then evaporated to leave 31.1 g. of brown oil. The oil is chromatographed over 125 g. of neutral alumina. Eluate from petroleum ether-benzene (9:1–1:1) affords 4a-phenyl - 7 - methoxy-2,3,4,4a-9,10-hexahydrophenanthren-2-one (IR: $\nu_{max}^{CCl_4}$ 1682, 1610, 1580, 1500, 1260, 1044 cm.$^{-1}$)

Semicarbazone: M.P. 216–218° C. (with decomposition).

EXAMPLE 4

1-propyl-6-methoxy-3,4-dihydronaphthalene

To a propylmagnesium iodide solution prepared from 250 ml. of anhydrous ether, 12 g. of magnesium metal and 85 g. of propyl iodide, a solution of 44 g. of 6-methoxy-1,2,3,4-tetrahydronaphthalen-1-one in anhydrous ether-tetrahydrofuran mixture (350 ml.:50 ml.) is added and the resulting mixture is treated in the same manner as Example 3, whereby 1-propyl-6-methoxy-1,2,3,4-tetrahydronaphthalen-1-ol is obtained.

The resultant product affords 1-propyl-6-methoxy-3,4-dihydronaphthalene by dehydration with methanol-concentrated hydrochloric acid.

1-propyl-6-methoxy-1,2,3,4-tetrahydronaphthalen-2-one

According to the same procedure as in the above Example 3, the above obtained 1-propyl-6-methoxy-1,2,3,4-tetrahydronaphthalene is oxidized by perbenzoic acid in chloroform, hydrolyzed by acid, and the product is purified through semicarbazone, whereby 1-propyl-6-methoxy-1,2,3,4-tetrahydronaphthalen-2-one is obtained.

4a-propyl-7-methoxy-2,3,4,4a,9,10-hexahydrophenanthren-2-one

The thus obtained product is subjected to condensation with 3-buten-2-one according to the same procedure as in Example 3 and affords 4a-propyl-7-methoxy-2,3,4,4a,9,10-hexahydrophenanthren-2-one, B.P.$_{0.01}$ 150° C.

EXAMPLE 5

1-isopropyl-6-methoxy-3,4-dihydronaphthalene

To an isopropylmagnesium iodide solution prepared from 120 ml. of anhydrous ether, 6 g. of magnesium metal and 42 g. of isopropyl iodide, a solution of 22 g. of 6-methoxy-1,2,3,4-tetrahydronaphthalen-1-one in anhydrous ether-tetrahydrofuran mixture (200 ml.:25 ml.) is added to react and the reaction mixture is treated in the same manner as in the above examples, whereby 1-isopropyl-6-methoxy - 1,2,3,4-tetrahydronaphthalen-1-ol is obtained. The product affords 1-isopropyl-6-methoxy-3,4-dihydronaphthalene, B.P.$_{2.5}$ 107–110° C. by dehydration with methanolic concentrated hydrochloric acid solution.

1-isopropyl-6-methoxy-1,2,3,4-tetrahydronaphthalen-2-one

The above dihydronaphthalene is oxidized with perbenzoic acid solution in chloroform and treated with acid, whereby 1 - isopropyl-6-methoxy-1,2,3,4-tetrahydronaphthalen-2-one is obtained.

4a-isopropyl-7-methoxy-2,3,4,4a,9,10-hexahydrophenanthren-2-one

The above tetrahydronaphthalen-2-one is allowed to react with 3-buten-2-one to afford 4a-isopropyl-7-methoxy 2.3,4,4a,9,10-hexahydrophenanthren-2-one.

EXAMPLE 6

1-allyl-6-methoxy-3,4-dihydronaphthalene

According to the procedure as described in the above examples, a solution of 22 g. of 6-methoxy-1,2,3,4-tetrahydronaphthalen - 1-one in anhydrous ether-tetrahydrofuran mixture (200 ml.:25 ml.) is added to an allylmagnesium iodide solution prepared from 120 ml. of anhydrous ether, 6 g. of magnesium metal and 42 g. of allyl iodide to react and thereafter treated by the conventional manner to afford 1 - allyl - 6 - methoxy - 1,2,3,4-tetrahydronaphthalen-1-ol, which is converted to 1-allyl-6-methoxy-3,4-dihydronaphthalene by treatment with methanol-concentrated hydrochloric acid mixture.

1-allyl-6-methoxy-1,2,3,4-tetrahydronaphthalen-2-one

The resulting product is subjected to oxidation with perbenzoic acid solution in chloroform followed by acid-decomposition, whereby 1 - allyl - 6-methoxy-1,2,3,4-tetrahydronaphthalen-2-one, B.P.$_{0.09}$ 130–135° C. is obtained.

4a-allyl-7-methoxy-2,3,4,4a,9,10-hexahydrophenanthren-2-one

The above obtained compound is subjected to reaction with 3-buten-2-one to afford 4a-allyl-7-methoxy-2,3,4,4a,-9,10-hexahydrophenanthren-2-one (IR: $\nu_{max}^{CCl_4}$ 3040, 1678, 1625, 1613, 1580, 1500, 998, 918 cm.$^{-1}$).

EXAMPLE 7

1-ethyl-6-methoxy-1,2,3,4-tetrahydronaphthalen-2-one

To a solution of 6 - methoxy - 1,2,3,4 - tetrahydronaphthalen-2-one in benzene (100 g./2 liters), 81 g. of pyrrolidine purified by distillation is added and the resultant mixture is refluxed for 1 hour in nitrogen atmosphere. The reaction mixture is then distilled over to remove the solvent gradually within 1 hour (whereby water produced by the reaction is simultaneously distilled off according to azeotropy) and further distilled under reduced pressure to remove the solvent completely, whereby oily crude 2 - pyrrolidino-6-methoxy-3,4-dihydronaphthalene is obtained.

The resultant product is dissolved into 480 ml. of anhydrous dioxane and, after addition of 310.6 g. of ethyl iodide, refluxed for 4 hours under stirring in nitrogen atmosphere. The reaction mixture is concentrated under reduced pressure to leave residue, which is heated for 1.5 hours with 300 ml. of water and 15 ml. of acetic acid, on a water bath. After being cooled, the resulting mixture is admixed with water and extracted with dichloromethane. The extract is washed with water, dried and evaporated to leave residue, which is purified by distillation in vacuo and affords 96.5 g. of 1-ethyl-6-methoxy-1,2,3,4-tetrahydronaphthalen-2-one as colorless oil of B.P.$_{0.5}$ 135° C.

4a-ethyl-7-methoxy-2,3,4,4a,9,10-hexahydrophenanthren-2-one

To a solution of 5.82 g. of sodium metal in 330 ml. of anhydrous methanol, a solution of 6-methoxy-1-ethyl-1,2,3,4 - tetrahydronaphthalene in anhydrous methanol (94.1 g./520 ml.) is added at −10 to −6° C. under stirring in nitrogen atmosphere. To the resultant solution there is further added a solution of 3-buten-2-one in anhydrous methanol (35.4 g./250 ml.) dropwisely within about 40 minutes at the same temperature. The resultant mixture is stirred for further 30 minutes at the same temperature and then for 1.3 hours at room temperature, and finally refluxed for 2 hours. The reaction mixture is cooled, admixed with 25 ml. of glacial acetic acid and thereafter stood overnight at room temperature. The mixture is concentrated to ⅓ volume under reduced pressure, water added and extracted with dichloromethane. The extract is washed with water, dried and evaporated to leave 137 g. of oily residue. The oily residue is chromatographed over a mixture of 300 g. of alumina and 20 g. of decolorizing charcoal. The eluates from petroleum ether and petroleum ether-benzene mixture (9:1–8:2) are combined and recrystallized to afford 79 g. of 4a-ethyl-7-methoxy - 2,3,4,4a,9,10 - hexahydrophenanthren-2-one, M.P. 74–76° C. Average yield is 54%.

EXAMPLE 8

1-allyl-6-methoxy-1,2,3,4-tetrahydronaphthalen-2-one

A mixture of 30 g. of 6-methoxy-1,2,3,4-tetrahydronaphthalen-2-one and 24.2 g. of pyrrolidine in anhydrous benzene (600 ml.) is refluxed for 1 hour in nitrogen atmosphere. The reaction mixture is further heated for about 3 hours, during which benzene and water produced in the reaction are removed by azeotropy, and thereafter evaporated completely under reduced pressure to leave 39 g. of crude crystalline 2-pyrrolidino-6-methoxy-3,4-dihydronaphthalene.

The resultant crude crystalline product is dissolved into 260 ml. of acetonitrile, to which a solution of allyl bromide in acetonitrile (24.5 g./50 ml.) is added dropwisely within 10 minutes. The resultant mixture is refluxed for 16 hours under nitrogen atmosphere and distilled to remove acetonitrile. The resulting distillation residue is admixed with 150 ml. of water and heated on a steam bath for 20 minutes. The reaction mixture is cooled and thereafter extracted with ether. The extract is washed with water, dried, evaporated to remove solvent, and the resulting brownish oily residue is purified by distillation under reduced pressure, whereby 27.1 g. (yield: 74%) of 1 - allyl-6-methoxy-1,2,3,4-tetrahydronaphthalen-2-one is obtained as colorless oil of B.P.$_{0.09}$ 130–135° C.

4a-allyl-7-methoxy-2,3,4,4a,9,10-hexahydrophenanthren-2-one

Into a sodium methoxide solution prepared from 1.54 g. of sodium metal and 65 ml. of anhydrous methanol, a solution of 1-allyl-6-methoxy-1,2,3,4-tetrahydronaphthalen-2-one in anhydrous methanol (26.4 g./140 ml.) is added at −8 to −4° C. under stirring. A solution of 3-buten-2-one in anhydrous methanol (9.52 g./60 ml.) is added to the above mixture dropwisely within 50 minutes. The resulting mixture is stirred for 30 minutes at −5° C. and for 1 hour at room temperature, and then refluxed for 2 hours. The reaction mixture is cooled, admixed with 5 ml. of acetic acid to neutralize, then stood overnight in nitrogen atmosphere, and concentrated under reduced pressure. The residue is admixed with water and extracted with chloroform. The extract is treated by the conventional procedure as above, whereby 37.1 g. of oily crude 4a-allyl-7-methoxy-2,3,4,4a,9,10-hexahydrophenanthren-2-one is obtained.

Thus produced product is dissolved into 600 ml. of ethanol and the resulting solution is admixed with a mixture of 18.5 g. of semicarbazide hydrochloride, 13.6 g. of sodium acetate and 120 ml. of water. The resultant mixture is refluxed for 1 hour and concentrated to ⅔ volume under reduced pressure. The residual is admixed with 120 ml. of water and cooled to produce crystals, which are collected by filtration and then recrystallized from dichloromethane-ethanol mixture, whereby 24.94 g. of the corresponding semicarbazone, M.P. 189.5–191° C. (with decomposition) is obtained.

The semicarbazone (23.34 g.) is suspended in a mixture of 50 ml. of benzene and 200 ml. of 1 N hydrochloric acid and heated on a water bath under vigorous stirring. After 2 hours heating, the reaction mixture is poured into water containing crushed ice and the benzene layer is collected. The aqueous layer is extracted with ether and the resulting ether extract is combined with the above benzene layer. The combined layers are successively washed with aqueous dilute sodium carbonate solution and water, dried over anhydrous sodium sulfate, and evaporated to remove solvent under reduced pressure, whereby 19.20 g. of oily 4a-allyl-7-methoxy-2, 3,4,4a,9,10-hexahydrophenanthren-2-one is obtained.

The phenanthrenone (7.1 g.) is chromatographed over 250 g. of alumina and the eluates from petroleum ether-benzene (7:3–1:1) are collected. The collected eluates are further chromatographed over 30 g. of silica gel. Eluates from benzene and benzene-dichloromethane (9:1–7:3) are combined, evaporated under reduced pressure and then dried in vacuo, whereby pure 4a-allyl-7-methoxy-2,3,4,4a,9,10-hexahydrophenanthren-2-one (yellow oil) is obtainable.

IR: $\nu_{max.}^{CCl_4}$ 3040, 1678, 1625, 1613, 1580, 1500, 998, 918 cm.$^{-1}$

EXAMPLE 9

1-propyl-6-methoxy-1,2,3,4-tetrahydronaphthalen-2-one

A mixture of 10 g. of 6-methoxy-1,2,3,4-tetrahydronaphthalen-2-one, 8.1 g. of freshly distilled pyrrolidine and 200 ml. of anhydrous benzene is refluxed for 1 hour under nitrogen stream, distilled gradually (during distillation, water produced according to the reaction is simultaneously removed by azeotrophy), and evaporated completely under reduced pressure. The evaporation residue (crude 2-pyrrolidino-6-methoxy-3,4-dihydronaphthalene) is dissolved in 50 ml. of anhydrous dioxane and, after adding 38.6 g. of propyl iodide dropwisely within 2 minutes, refluxed for 4 hours under stirring and nitrogen stream. The reaction mixture is stood overnight and then evaporated under reduced pressure. The resulting residue is admixed with 30 ml. of water and 2 ml. of acetic acid, and heated on a water bath for 2 hours. The reaction mixture is cooled, admixed with ice-water and extracted with dichloromethane. The extract is treated by a conventional procedure and affords 16.7 g. of oily product, which gives 6.2 g. of pure 1-propyl-6-methoxy-1,2,3,4-tetrahydronaphthalen-2-one, B.P.$_{1.0}$ 140–145° C. by distillation.

4a-propyl-7-methoxy-2,3,4,4a,9,10-hexahydrophenanthren-2-one

Into a sodium methoxide solution prepared by a reaction of 360 mg. of sodium metal and 20 ml. of anhydrous methanol, a solution of 6.2 g. of 6-methoxy-1-propyl-1,2,3,4-tetrahydronaphthalen-2-one in 35 ml. of anhydrous methanol is added at −10 to −20° C. under stirring and nitrogen atmosphere. To the resultant solution there is further added a solution of 2.2 g. of 3-buten-2-one in 17 ml. of anhydrous methanol dropwisely within 60 minutes. The resultant mixture is stirred for 30 minutes at the same temperature, kept for 2 hours at room temperature, and refluxed for 2 hours. The reaction mixture is then admixed with 2 ml. of acetic acid and kept at room temperature overnight. The mixture is then admixed with ice-water, extracted with dichloromethane and resulting extract is treated in a conventional manner, whereby 7.3 g. of crude product is obtained. The crude product is dissolved in 100 ml. of methanol, vigorously shaken with aqueous sodium pyrosulfite solution (22 g. in 110 ml. of water) for 10 minutes, and then extracted with dichloromethane. The extract is washed twice with aqueous sodium pyrosulfite solution of the same concentration as above, dried and then evaporated to give 6.45 g. of oily product. The oily product is chromatographed over 125 g. of alumina. Eluates from petroleum ether-benzene (9:1–1:1) are combined (3.16 g.) and converted to 2.26 g. of crystalline semicarbazone (M.P. 196–198° C.) according to the conventional manner with 1.56 g. of semicarbazide hydrochloride, 1.15 g. of sodium acetate in aqueous ethanol.

The above semicarbazone (2.155 g.) is heated to hydrolyse in a mixture of 5 ml. of benzene and 20 ml. of 1 N hydrochloric acid and thereafter treated according to the conventional manner. The thus obtained oily product is distilled under reduced pressure to afford 4a-propyl-7-methoxy - 2,3,4,4a,9,10 - hexahydrophenanthren-2-one, B.P.$_{0.1}$ 170° C. (bath temperature).

EXAMPLE 10

4a-butyl-7 - methoxy - 2,3,4,4a,9,10 - hexahydrophenanthren-2-one, 4a-isopropyl-7 - methoxy - 2,3,4,4a,9,10-hexahydrophenanthren-2-one and 4a-phenyl-7-methoxy-2,3,4,4a,9,10-hexahydrophenanthren-2-one According to the similar procedure to the above Examples 7 to 8, 4a-butyl-7-methoxy-2,3,4,4a,9,10-hexahydrophenanthren-2-one, 4a-isopropyl-7-methoxy - 2,3,4,4a,9, 10-hexahydrophenanthren - 2-one and 4a-phenyl-7-methoxy-2,3,4,4a,9,10-hexahydrophenanthren-2-one are prepared respectively through 1-butyl-6-methoxy-1,2,3,4-tetrahydronaphthalen-2-one, 1-isopropyl - 6-methoxy-1,2, 3,4-tetrahydronaphthalen-2-one and 1-phenyl-6-methoxy-1,2,3,4-tetrahydronaphthalen-2-one.

EXAMPLE 11

1-ethyl-6-methoxy-3,4-dihydronaphthalene

Into a solution prepared by reaction of 60 g. of magnesium metal and 462 g. of ethyl iodide in 800 ml. of anhydrous ether, a solution of 176 g. of 6-methoxy-1,2,3,4-tetrahydronaphthalen-1-one in a mixture of 500 ml. of anhydrous benzene and 300 ml. of ether is added and reacted as described in Example 1, in nitrogen atmosphere. The resulting reaction mixture is thereafter treated with aqueous ammonium chloride solution (100 g./400 ml.) and large amount of ice-water, and extracted with ether. The extract (1 - ethyl - 6-methoxy - 1,2,3,4-tetrahydronaphthalen-1-ol) is thereafter treated as described in Example 1, whereby 179 g. (yield: 95%) of 1-ethyl-6-methoxy-3,4-dihydronaphthalene is obtained.

1-ethyl-6-methoxy-1,2,3,4-tetrahydronaphthalen-2-one

The above resulting 1 - ethyl - 6-methoxy-3,4-dihydronaphthalen-2-one (18.8 g.) in 300 ml. of methanol is oxidized by 222 ml. of 0.542 molar-concentration solution of perbenzoic acid in chloroform and the reaction mixture is treated, after the manner of Example 1. The thus obtained oily product (26.7 g.) is distilled under reduced pressure in the presence of 70 mg. of potassium hydrogensulfate, whereby 19.14 g. of crude 1-ethyl-6-methoxy - 1,2,3,4 - tetrahydronaphthalen - 2-one, B.P.$_{0.35}$ 108–121° C., is obtained.

The above crude oily 1-ethyl-6-methoxy-1,2,3,4-tetrahydronaphthalen-2-one is converted to semicarbazone, according to the conventional manner, to yield 19.75 g. (yield: 76% from 1-ethyl-6-methoxy-3,4-dihydronaphthalene) of crystals of M.P. 182–185° C.

The resultant semicarbazone is hydrolyzed and treated as described in Example 1, whereby pure 1-ethyl-6-methoxy - 1,2,3,4 - tetrahydronaphthalen - 2-one, B.P.$_{0.6}$ 130–135° C., is obtained (yield: 94%).

4a-ethyl-7-methoxy-2,3,4,4a,9,10-hexahydrophenanthren-2-one

According to the same procedure as Example 1, 194.5 g. of 1 - ethyl - 6 - methoxy-1,2,3,4-tetrahydronaphthalen-2-one is reacted with 73.5 g. of 3-buten-2-one in methanol in presence of sodium methoxide (prepared from 12 g. of sodium metal) and the resultant reaction mixture is neutralized by addition of acetic acid and concentrated to ¼ volume. The concentrate is admixed with 1300 ml. of ice-water and extracted with ether. The ether layer is conventionally treated to yield oily evaporation residue. The residue is crystallized from ether-petroleum ether mixture, whereby 163.6 g. (yield: 67%) of 4a-ethyl-7-methoxy - 2,3,4,4a,9,10 - hexahydrophenanthren - 2-one, M.P. 70–71° C., is obtained.

EXAMPLE 12

4a-ethyl-7-hydroxy-2,3,4,4a,9,10-hexahydrophenanthren-2-one

According to the same procedure as in the above Examples 1 and 11, 6 - hydroxy - 1,2,3,4 - tetrahydronaphthalen-1-one is subjected to reaction with ethylmagnesium iodide followed by hydolysis to convert to 1-ethyl-6-hydroxy-3,4-dihydronaphthalene, which is subjected to reaction with perbenzoic acid to convert to 1-ethyl-6-hydroxy - 1,2,3,4 - tetrahydronaphthalen-2-one, which is subjected to reaction with 2-buten-2-one to yield 4a-ethyl-7 - hydroxy - 2,3,4,4a,9,10-hexahydrophenanthren-2-one, M.P. 169–171° C.

EXAMPLE 13

4a-ethyl-7-ethoxy-2,3,4,4a,9,10-hexahydrophenanthren-2-one

According to the same procedure as in the above Examples 1 and 11, 6-ethoxy-1,2,3,4-tetrahydronaphthalen-1-one is subjected to reaction with ethylmagnesium iodide followed by hydrolysis to convert to 1-ethyl-6-ethoxy-3,4-dihydronaphthalene, which is oxidized by perbenzoic acid to convert to 1-ethyl-6-ethoxy-1,2,3,4-tetrahydronaphtahalen-2-one, which is subjected to reaction with 3-buten-2-one to yield 4a-ethyl-7-ethoxy-2,3,4,4a,9,10 - hexahydrophenanthren - 2 - one, plates of M.P. 61–62° C., from ether-pentane mixture.

EXAMPLE 14

1-methyl-4a-ethyl-7-methoxy-2,3,4,4a,9,10-hexahydrophenanthren-2-one

According to the quite similar procedure to the above Examples 1 and 11, 6-methoxy-1,2,3,4-tetrahydronaphthalen-1-one is converted to 1-ethyl-6-methoxy-1,2,3,4-tetrahydronaphthalen-2-one, which is subjected to reaction with 1-penten-3-one in the presence of sodium methoxide to obtain 1 - methyl - 4a-ethyl-7-methoxy-2,3,4,4a,9,10-hexahydrophenanthren-2-one, oil of B.P.$_{0.3}$ 180° C. (bath temperature).

EXAMPLE 15

3α-methyl-4a-ethyl-7-methoxy-2,3,4,4a,9,10-hexahydrophenanthren-2-one

According to the quite similar mannner to that in the above Examples 1 and 11, 6-methoxy-1,2,3,4-tetrahydronaphthalen - 1 - one is converted to 1 - ethyl - 6-methoxy-1,2,3,4-tetrahydronaphthalen-2-one, which is subjected to reaction with 2 - methyl - 1-buten-3-one in presence of sodium methoxide to obtain 3α - methyl - 4a - ethyl - 7-methoxy - 2,3,4,4a,9,10-hexahydrophenanthren-2-one, oil of B.P.$_{0.01}$ 150–160° C. (bath temperature).

What we claim is:

1. A compound of the formula:

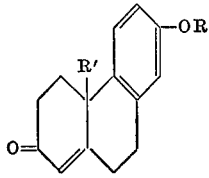

wherein R is a hydrogen atom, methyl group or ethyl group and R' is phenyl group or allyl group.

2. 4a - phenyl - 7 - methoxy - 2,3,4,4a,9,10 - hexahydrophenanthren-2-one.

3. 4a - allyl - 7 - methoxy - 2,3,4,4a,9,10 - hexahydrophenanthren-2-one.

4. A compound of the formula:

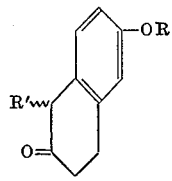

wherein R is a hydrogen atom, methyl group or ethyl group and R' is phenyl group or allyl group.

5. 1 - phenyl - 6 - methoxy - 1,2,3,4-tetrahydronaphthalen-2-one.

6. 1 - allyl - 6 - methoxy - 1,2,3,4 - tetrahydronaphthalene-2-one.

7. A compound of the formula:

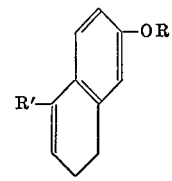

wherein R is a hydrogen atom, methyl group or ethyl group and R' is phenyl group or allyl group.

8. 1 - phenyl - 6 - methoxy - 3,4-dihydronaphthalene.

9. 1 - allyl - 6 - methoxy - 3,4 - dihydronaphthalene.

References Cited

UNITED STATES PATENTS 3,313,702   4/1967   Joly et al. _____ 260—397.45

DANIEL D. HORWITZ, Primary Examiner

U.S. Cl. X.R.

260—268, 297, 326.81, 347.7, 465, 571, 612, 621; 424—331